April 19, 1966   H. FUHRMANN   3,246,802
LUBRICANT CARTRIDGE

Filed Oct. 3, 1962   2 Sheets-Sheet 1

INVENTOR.
HEINRICH FUHRMANN
BY Kurt Kelman
Agent

April 19, 1966  H. FUHRMANN  3,246,802
LUBRICANT CARTRIDGE
Filed Oct. 3, 1962  2 Sheets-Sheet 2

INVENTOR.
HEINRICH FUHRMANN
BY
Kurt Kelman
Agent

United States Patent Office 3,246,802
Patented Apr. 19, 1966

3,246,802
LUBRICANT CARTRIDGE
Heinrich Fuhrmann, Eschersheimer Landstrasse 68,
Frankfurt am Main, Germany
Filed Oct. 3, 1962, Ser. No. 228,135
8 Claims. (Cl. 222—95)

This application is a continuation-in-part of my copending application Serial No. 24,557, filed on April 25, 1960, for "Lubrication Means," now abandoned.

This invention relates to portable grease guns having low-pressure and high-pressure compartments, and to similar lubricating devices permanently mounted on bearings, and more particularly to such grease guns and lubricating devices equipped with a replaceable, factory-filled lubricant cartridge which is deformed by atmospheric air pressure or by air under pressure in the aforementioned low-pressure compartment whenever a vacuum is applied to the cartridge outlet whereby the contents of the cartridge are discharged into the bearing to be lubricated.

In some known lubricating devices a low-pressure cylinder is manually filled with bulk lubricant from a storage container. This filling method permits contamination of the lubricant or grease which may adversely affect the life of the bearing.

It has been proposed to equip grease guns with replaceable lubricant cartridges, including a discharge piston, to avoid such contamination. The cylindric cartridge of metal or the like must have a smooth inner wall for sealing engagement with the piston, and must be rigid for the same reason. This type of cartridge requires special care in handling to prevent deformation. The cost of such a cartridge is thus many times higher than that of the lubricant contained in the cartridge.

It is the object of this invention to provide an inexpensive, and therefore disposable cartridge for dispensing lubricant in portable grease guns or stationary lubrication fittings.

Another object is the provision of a cartridge of the type described which releases its contents substantially completely when uniform fluid pressure is externally applied to the body of the cartridge.

A more specific object is the provision of a cartridge in which a continuously open and unimpeded flow path for the lubricant is maintained at all times while the lubricant is squeezed from the cartridge by external fluid pressure.

With these and other objects in view, the invention in one of its aspects provides a cartridge having a bottom portion and a cover portion, and a wall portion connecting the bottom and cover portions and defining therewith the interior space of the cartridge. The bottom portion is of relatively pliable material, and the cover portion of relatively rigid material. The interposed wall portion gradually increases in rigidity in a direction from the bottom to the cover portion. When the cartridge is exposed to uniform external fluid pressure, it is therefore gradually collapsed and the lubricant contents thereof are discharged through suitable means provided on the cover portion. The collapse of the cartridge begins with the most pliable bottom portion and progresses through the interposed wall portion toward the cover portion so that flow of fluid through the discharge means is unimpeded at all times.

Other features and advantages of the invention will hereinafter become fully apparent from the following description of the annexed drawings which illustrate several preferred embodiments thereof, and wherein.

Figure 1:
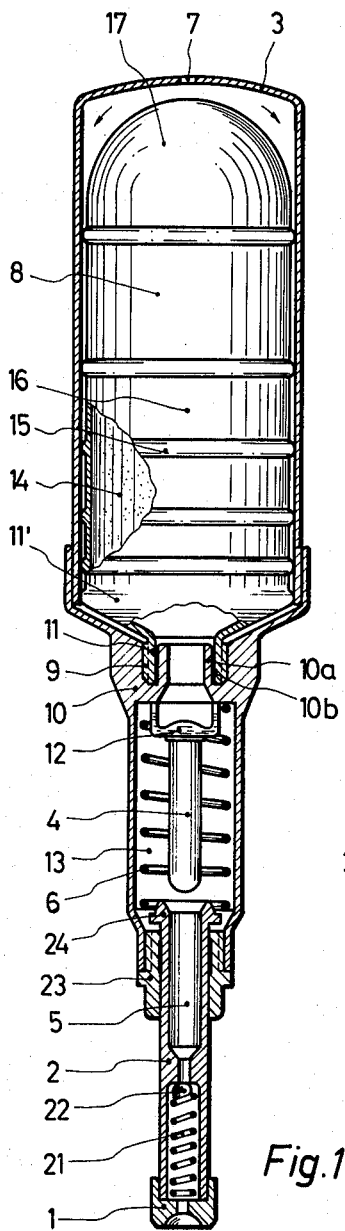
FIG. 1 shows a grease gun of circular cross section and equipped with a disposable lubricant cartridge of this invention, the gun being shown in section on its axis, and the cartridge being partly broken away to reveal internal parts.

Referring now to the drawing in detail, and initially to FIG. 1, there is seen a grease gun or lubricating gun having three main portions. A hollow, cylindrical shell 3 of substantially rigid material forms the body of the gun. It has a closed bottom formed with a vent opening 7 and an open top releasably inserted in a neck portion 10. The latter carries the third or operating portion 2 of the gun. The three gun portions are of circular cross section about a common axis, and the operating portion 2 is axially slidable into and out of a low pressure chamber 13 formed in the neck portion 10.

The free axial end of the operating portion 2 carries a coupling member 1 for sealing connection to a conforming lubrication fitting on the machinery to be lubricated. An opening in the member 1 communicates with a channel which passes axially through the operating portion 2. A spring 21 in the channel urges a spherical valve member 22 against a seat in the channel to form a check valve which prevents entry of air into the gun when the internal pressure is lower than atmospheric pressure. The terminal portion of the channel remote from the coupling member 1 constitutes a high pressure cylinder 5 which freely communicates with the low pressure chamber 13 in the condition of the gun illustrated in FIG. 1.

A return spring 6 permanently urges the operating portion 2 to move outward of the chamber 13, and into a position of engagement between respective abutment members 23, 24 on the neck portion 10 and the operating portion 2, whereby outward movement of the latter is limited.

An annular radial wall of the chamber 13 opposite the cylinder 5 carries the bifurcated base 12 of a high-pressure plunger 4 which is axially aligned with the cylinder 5. A short axial tube 10a which freely communicates with the low pressure chamber 13 integrally projects from the neck portion 10 toward the shell 3 and forms the inner wall of an annular groove in the neck member 10. The outer annular wall of the groove is equipped with threads 9. The surface of the tube 10a in the groove is covered with a resilient sleeve 10b.

The body 8 of a grease cartridge with which this invention is more particularly concerned is inserted in the cavity of the shell 3 and almost fills the same. The open axial discharge nipple 11 of the cartridge is externally threaded and engages the threads 9 to form a seal the tightness of which is ensured by resilient engagement of the sleeve 10b with the inner wall of the nipple 11. The cartridge body 8 consists partly of a cylindrical tube 16 of grease resistant pliable material, preferably of moldable thermoplastic material such as polyethylene or polyvinyl chloride. The tube 16 is reinforced by five integral annular stiffening ribs 15, spaced from each in the direction of the direction of the tube axis. The axial end the latter remote from the neck 11 is closed by an integral hemispherical bottom portion 17 free from reinforcing ribs. The axial spacing of the ribs 15 decreases from the bottom portion 17 toward the nipple 11. The nipple 11 is of thicker material than the tube 16, and is an integral part of a conical cover portion 11' of the cartridge which is of relatively great rigidity because of its shape and the thickness of its wall.

The cartridge is filled with a semi-fluid lubricant 14.

The afore-described apparatus is operated as follows:

To insert a cartridge, the shell 3 is removed from the neck portion 10, and the operating portion 2 is forced into the low pressure chamber 13 against the force of the return spring 6 until the abutment member 24 makes contact with the base 12 of the plunger 4 while the plunger is received in the cylinder 5. A grease cartridge the neck of which is normally covered by a screw cap, is opened and threadedly inserted in the neck portion 10. The shell 3 which may consist of metal or plastic is put into place on the neck portion 10, and the operating portion 2 is permitted to move outward of the chamber 13 under the pressure of the return spring 6.

Since the neck portion 10 is sealed to the operating portion 2 and to the cartridge neck 11, a partial vacuum is formed in the chamber 13 and in the cylinder 5. The grease 14 in the cartridge body 8 is acted upon by atmospheric pressure transmitted by the pliable portions of the tube 16 and is injected into the low pressure chamber 13 and the cylinder 5. It fills the latter at least in part. When the coupling member 1 is next abutted against a lubrication fitting and the shell 3 is axially urged toward the member 1, the plunger 5 enters the cylinder 4 and expels the lubricant and any residual air from the cylinder through the check valve 21, 22 while the spring 6 is being compressed. After expansion and compression of the spring 6 has been repeated several times, the low pressure chamber 13 and high pressure cylinder 5 are completely filled with lubricant at all times.

As the lubricant is drawn from the cartridge body 8, the walls of the latter gradually collapse under the external atmospheric pressure. This collapse begins with the pliable bottom portion 8 and progresses from there toward the discharge nipple 11 in a gradual manner because of the gradually increasing rigidity of the axially consecutive portions of the cartridge walls as the stiffening ribs 15 become closer spaced. Eventually most of the grease is expelled from the cartridge, and there remains only a small residue adjacent the conical cover portion 11' about the discharge nipple 11. The major portion of the cartridge body 8 is flattened.

Figure 2:
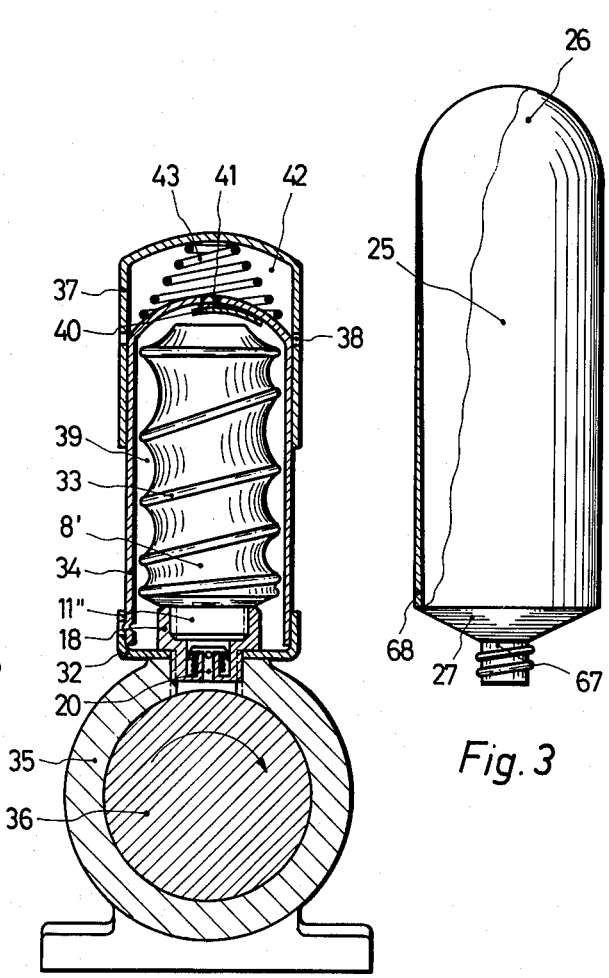
FIG. 2 shows a bearing equipped with a stationary lubrication fitting provided with another embodiment of the lubricant cartridge of the invention, the view being in radial section through the bearing.

In the apparatus illustrated in FIG. 2, a shaft 36 is journaled in a pillow block 35. A threaded aperture in the top portion of the block 35 receives a coupling 18 which holds the dish-shaped centrally apertured cover portion 32 of a lubrication fitting to the pillow block. A shell 34 having the shape of a deep cylindrical cup is closed by engagement with the cover portion 32. The spherically curved bottom of the shell 34 has an opening 41. A flap 40 attached to the inside of the bottom constitutes a check valve which obstructs the opening 41 unless the pressure in the cavity 30 of the shell 34 is lower than that in a space 42 enclosed between the shell bottom and a cap 37.

The cap 37 has a cylindrical wall which sealingly envelops the cylindrical axial wall of the shell 34 and is axially slidable thereon. A compression spring 43 is interposed between the shell bottom and the cap 37 to urge the latter to move into the position illustrated in FIG. 2. The cap 37 has ports 38 which connect the space 42 with the ambient atmosphere in the illustrated relative position of the shell 34 and the cap 37, and which are blocked when the cap is moved axially against the pressure of the spring 43.

A lubricant cartridge is enclosed in the cavity 39. It has a body 8' of pliable and collapsible plastic sheet material having the shape of a helically fluted cylinder. The flutes are defined by a helical reinforcing rib 33 the consecutive convolutions of which approach each other in an axial direction toward the neck 11" of the cartridge. The cartridge neck is threadedly connected to the coupling 18. A check valve arrangement 20 in the coupling 18 admits lubricant from the cartridge neck 11" into the bearing of the shaft 36 in the block 35, but prevents air from being drawn into the cartridge.

The apparatus of FIG. 2 operates as follows:

As lubricant is consumed in the bearing, the pressure in the coupling 18 adjacent the shaft 36 is lowered below that in the cartridge body 8', and lubricant is drawn into the bearing. The space 39 normally is filled with air under superatmospheric pressure, and the cartridge body 8' is gradually collapsed by external pressure as lubricant is withdrawn from within it. Collapse of the body 8' begins with that portion in which the convolutions of the rib 33 are farthest spaced from each other, that is, in the bottom portion of the body 8' which is farthest spaced from the neck 11". The collapsed portion of the body 8' gradually grows in a direction toward the neck 11" so that the aperture of the latter is unobstructed until the lubricant is completely expelled.

Discharge of lubricant into the bearing may be hastened by manually pressing the cap 37 toward the shell 34. The arrangement of the cap and shell in effect constitutes a piston pump with spring return. On the compression stroke, the ports 38 are blocked and the opening 41 passes compressed air from the space 42 into the cavity 39 while the flap 40 moves away from the opening 41. During the spring-actuated suction stroke, the opening 41 is closed by the flap 40 under the internal pressure in the cavity 39. Additional air is admitted to the space 42 when the cap 37 is returned to the illustrated position, but the flap 40 blocks the opening 41 until sufficient lubricant has been discharged through the check valve 20 to reduce the pressure in the cavity 39 to substantially atmospheric pressure.

It will be appreciated that the lubricant cartridges shown in FIGS. 1 and 2 are interchangeable in the grease gun and the lubrication fitting of these figures if equipped with identically threaded necks. The several embodiments of the lubricant cartridge of the invention disclosed hereinafter are suited for use in either device if correspondingly dimensioned, and description of additional embodiments will therefore be limited to the cartridge.

Figure 3:
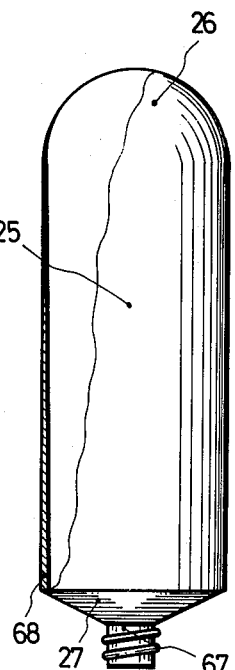
FIGS. 3 and 4 are side-elevational views of additional embodiments of the cartridge of the invention, the cartridges being partly illustrated in elevational section.

The cartridge shown in FIG. 3 consists essentially of a cylindrical wall 25 defining a lubricant storage space which is axially confined between a spherical bottom 26 and a conical cover 27. A threaded neck 67 is arranged on the cover 27 to provide a discharge. The thickness of the cartridge wall is smallest in the bottom 26. The cylindrical wall 25 uniformly increases in thickness from the bottom to a portion 68 thereof contiguously adjacent the conical cover 27 which is of a thickness similar to that of the wall portion 68. When exposed to gradually rising external fluid pressure, the cartridge walls gradually collapse, the collapse beginning at the bottom 26 and progressing thence gradually toward the neck 67 because of the increasing resistance of the heavier wall portions.

Figure 4:
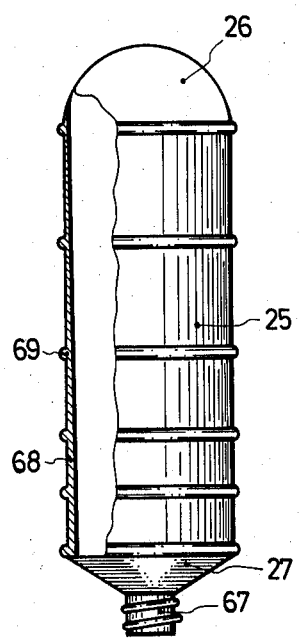

The cartridge shown in FIG. 4 combines the basic structure shown in FIG. 3 with certain features of the cartridge illustrated in FIG. 1. The bottom 26 and cover 27 of the cartridge are connected by a cylindrical wall 25' which increases in thickness from the bottom toward a portion 68' adjacent the cover 27. Further to ensure the desired gradual collapse of the cartridge under gradually rising external fluid pressure, the basically cylindrical wall 25' carries integral annular ribs 69 which are arranged in respective radial planes the spacing of which decreases in a direction from the bottom 26 toward the cover 27. The neck 67 of the cartridge thus remains unobstructed unless practically all lubricant is discharged when the cartridge is used in a grease gun or lubrication fitting of the type described.

Figure 5:
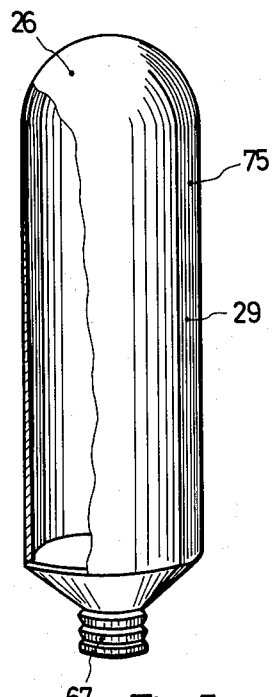
FIG. 5 is a perspective view of yet another embodiment of the invention, portions of the cartridge of FIG. 5 being broken away to show internal structure.
Figure 6:
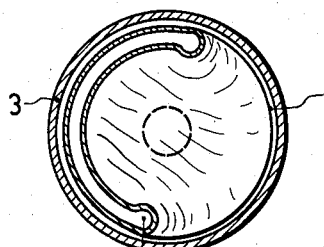
FIG. 6 is a cross sectional view of the cartridge of FIG. 5 in its cooperation with an element of the grease gun of FIG. 1.

The cartridge shown in FIG. 4 combines the basic view and in FIG. 6 in radial section combines an axially tapering wall 29 similar to that of the embodiment shown in FIG. 3 with two heavy axial ribs 75 integral with the wall 29 and extending almost to the bottom 26. The shape of the filled cartridge is shown in FIG. 5, and is partly indicated by broken lines in FIG. 6 which also shows the shell 3 of the grease gun of FIG. 1.

When grease is withdrawn from the neck 67, external pressure collapses the cartridge until one half of the wall 29 is conformingly laid against the inside of the other wall half as shown in fully drawn lines in FIG. 6. The axial length of the cartridge remains unchanged.

Figure 7:
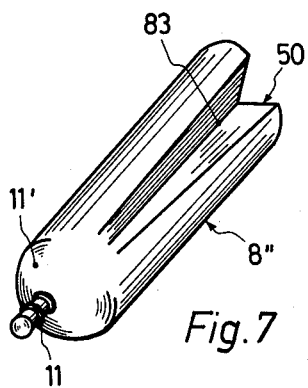
FIG. 7 is a perspective view of a further embodiment of the cartridge of the invention, the cartridge being empty.

FIGS. 7 to 10 illustrate a cartridge of yet another shape, and its changes of configuration during use. As shown in the perspective view of FIG. 7, the cartridge prior to being filled has a conical cover portion 11' and a neck 11 identical with the corresponding elements shown in FIG. 1. The body 8" of the cartridge is of basically cylindrical shape, but portions of the cylindrical wall are bent inward to constitute two folds 50 of which only one is seen in FIG. 7. Both folds are visible in the cross sectional view of FIG. 8. The wall portions 51 two of which constitute each fold 50 are flat and taper in width in a direction toward the cover portion 11'. Where they join at the crease of the fold, they are reinforced by an integral bead 83. The arcuate wall portions 53 are joined to the flat portion 51 at an acute angle along a ridge 52 which is integrally molded with the remainder of the cartridge from plastic material.

Figure 8:
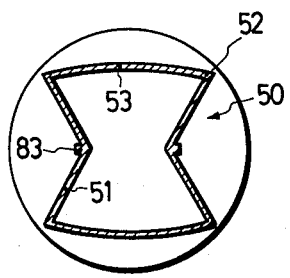
FIG. 8 shows the cartridge of FIG. 7 in cross section.

When the cartridge shown in FIGS. 7 and 8 is filled with lubricant, it assumes the shape of a cylinder on which the beads 83 and the ridges 52 form external axially extending ribs. Corresponding to the two folds 50 which become shallower toward the cover portion 11' in the cartridge as originally molded, the two beads 83 are arranged in a common axial plane. Two ridges 52 are associated with each bead. They are closest to the associated bead 83 near the cover portion 11' and diverge from each other and from the associated bead in an axial direction away from the cover portion. The rigidity of the cartridge wall therefore is highest near the cover portion 11' and the neck 11 of the cartridge, and decreases from there toward the opposite cartridge bottom.

Figure 9:
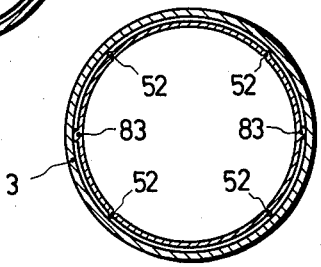
FIG. 9 illustrates the cross sectional shape of the cartridge of FIG. 7 when filled, and its spatial relationship to an element of the gun of FIG. 1.

As seen in FIG. 9, the filled cartridge almost occupies the space within the shell 3, and the beads 83 and ridges 52 constitute spacers which maintain an air space between the shell 3 and the main portion of the cartridge body 8".

Figure 10:
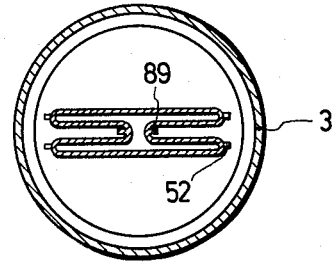
FIG. 10 is a cross sectional view of the cartridge of FIG. 7 is yet another operational condition.

When the cartridge is collapsed under external pressure, it is folded into an approximately H-shaped cross section as shown in FIG. 10. The several wall portions are tightly superimposed to expel all lubricant originally held in the cartridge. The portion of the cartridge near the bottom collapses first, that near the cover portion 11' collapses last, and drainage of lubricant from the cartridge is unimpeded at all times.

Obviously, many modifications and variations of the present invention are possible in the light of the above teachings. It is therefore to be understood that within the scope of the appended claims, the invention may be practiced otherwise than as specifically described.

What is claimed is:
1. A cartridge of the type described comprising:
 (a) a cover portion;
 (b) a bottom portion;
 (c) a cylindrical wall portion connecting said cover portion and said bottom portion and defining therewith an interior space in said cartridge;
 (d) said bottom portion being of relatively pliable material, said cover portion being of relatively rigid material, and the rigidity of said wall portion gradually increasing in a direction from said bottom portion to said cover portion; and
 (e) discharge means on said cover portion for outwardly discharging a fluid from said interior space,
  (1) said discharge means including pressure responsive one-way valve means for preventing flow of fluid inward of said space when the fluid pressure therein is lower than an outside pressure.

2. A cartridge as set forth in claim 1, wherein the thickness of said wall portion increases in said direction.

3. A cartridge as set forth in claim 1, wherein said wall portion includes a plurality of rib means spaced in said direction, the spacing of adjacent pairs of said rib means decreasing in said direction.

4. A cartridge as set forth in claim 3, wherein said rib means each include a reinforcing rib integral with said wall portion and extending in a plane transverse of said direction.

5. A cartridge as set forth in claim 1, wherein said wall portion includes a helical reinforcing rib, said rib having a plurality of convolutions spaced from each other in said direction, the spacing of consecutive convolutions decreasing in said direction.

6. A cartridge as set forth in claim 1, wherein said wall portion includes a plurality of reinforcing rib means elongated in said direction, each of said rib means longitudinally converging with another one of said rib means in said direction.

7. A cartridge of the type described comprising, in combination:
 (a) a cover portion;
 (b) a bottom portion;
 (c) a deformable cylindrical wall portion connecting said cover portion to said bottom portion and defining therewith an interior space in said cartridge, said wall portion having an axis, and said cover portion and said bottom portion being axially spaced from each other;
 (d) a plurality of stiffening rib means constituting respective turns of a continuous helical rib on said wall portion, said turns being each elongated circumferentially with respect to said axis, and axially spaced from each other, the axial spacing of said turns decreasing in a direction from said bottom portion to said cover portion; and
 (e) discharge means on said cover portion.

8. A cartridge as set forth in claim 7, wherein said stiffening rib means are integral with said wall portion.

References Cited by the Examiner

UNITED STATES PATENTS

| | | | |
|---|---|---|---|
| 863,260 | 8/1907 | Butterfield | 222—95 |
| 972,095 | 10/1910 | Booth | 222—92 |
| 2,009,761 | 7/1935 | Calderara | 222—92 |
| 2,109,549 | 3/1938 | Piquerez | 222—95 |
| 2,550,356 | 4/1951 | Jarvis | 222—496 |
| 2,778,534 | 1/1957 | Ramsey | 222—386.5 |
| 3,027,044 | 3/1962 | Winstead | 220—63 |
| 3,143,429 | 8/1964 | Swanson et al. | 222—215 X |

FOREIGN PATENTS

| | | |
|---|---|---|
| 1,168,103 | 8/1958 | France. |
| 479,077 | 1/1938 | Great Britain. |
| 798,338 | 7/1958 | Great Britain. |

OTHER REFERENCES

German Printed Application, 1,118,399, Nov. 30, 1961.

LOUIS J. DEMBO, *Primary Examiner.*

RAPHAEL M. LUPO, *Examiner.*

N. L. STACK, *Assistant Examiner.*